United States Patent
Tokoi et al.

(10) Patent No.: US 9,457,784 B2
(45) Date of Patent: Oct. 4, 2016

(54) BRAKE HYDRAULIC PRESSURE GENERATING DEVICE

(71) Applicant: NISSIN KOGYO CO., LTD., Ueda, Nagano (JP)

(72) Inventors: Hiroaki Tokoi, Nagano (JP); Kouji Sakai, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/658,708

(22) Filed: Mar. 16, 2015

(65) Prior Publication Data

US 2015/0274144 A1 Oct. 1, 2015

(30) Foreign Application Priority Data

Mar. 28, 2014 (JP) ................................ 2014-068211

(51) Int. Cl.
*B60T 15/02* (2006.01)
*B60T 7/04* (2006.01)
(Continued)

(52) U.S. Cl.
CPC .............. *B60T 15/028* (2013.01); *B60T 7/042* (2013.01); *B60T 8/363* (2013.01); *B60T 8/409* (2013.01);
(Continued)

(58) Field of Classification Search
CPC ...... B60T 7/042; B60T 11/103; B60T 11/28; B60T 15/028; B60T 8/409; B60T 8/441; B60T 13/686; B60T 8/363; B60T 8/4081; B60T 8/5025; B60T 13/146; B60T 13/662; B60T 11/20; F16K 31/0675
USPC .................. 303/3, 119.2, 119.3; 137/596.17, 137/599.18, 625.65; 251/129.15, 129.02, 251/129.05
See application file for complete search history.

(56) References Cited

U.S. PATENT DOCUMENTS 5,810,330 A * 9/1998 Eith ........................ B60T 8/363
137/630
5,865,213 A * 2/1999 Scheffel .................. B60T 8/363
137/596.17
(Continued)

FOREIGN PATENT DOCUMENTS

DE 19837207 A1 9/1999
EP 1363057 A2 11/2003
(Continued)

OTHER PUBLICATIONS

Machine Translation in English for JP 2013-227011A, Inventor: Komaba et al.; 10 pages; Retrieve Date: Jan. 29, 2016.*
(Continued)

*Primary Examiner* — Thomas J Williams
*Assistant Examiner* — Mariano Sy
(74) *Attorney, Agent, or Firm* — Andrew M. Calderon; Roberts Mlotkowski Safran Cole & Calderon, P.C.

(57) ABSTRACT

One embodiment of the present invention provides a brake hydraulic pressure generating device, including: a master cylinder, a stroke simulator and an on/off valve. The on/off valve opens/closes a branch hydraulic pressure passage, which branches from a main hydraulic pressure passage. The on/off valve includes a first valve mechanism including a first valve portion and a first valve seat, and a second valve mechanism including a second valve portion and a second valve seat. The first valve seat is formed in the second valve portion. A pressure receiving area in which brake hydraulic pressure acting from the stroke simulator side is received is set to be higher in the second valve portion than in the first valve portion.

4 Claims, 4 Drawing Sheets

(51) Int. Cl.
   *B60T 11/10*   (2006.01)
   *B60T 11/28*   (2006.01)
   *B60T 8/40*    (2006.01)
   *B60T 8/44*    (2006.01)
   *B60T 11/20*   (2006.01)
   *F16K 31/06*   (2006.01)
   *B60T 13/14*   (2006.01)
   *B60T 13/66*   (2006.01)
   *B60T 13/68*   (2006.01)
   *B60T 8/36*    (2006.01)
   *B60T 8/50*    (2006.01)

(52) U.S. Cl.
   CPC .............. *B60T 8/4081* (2013.01); *B60T 8/441* (2013.01); *B60T 8/5025* (2013.01); *B60T 11/103* (2013.01); *B60T 11/20* (2013.01); *B60T 11/28* (2013.01); *B60T 13/146* (2013.01); *B60T 13/662* (2013.01); *B60T 13/686* (2013.01); *F16K 31/0675* (2013.01)

(56) References Cited

U.S. PATENT DOCUMENTS

| | | | |
|---|---|---|---|
| 6,247,762 B1* | 6/2001 | Kusano | B60T 7/042 303/3 |
| 6,435,210 B1* | 8/2002 | Obersteiner | B60T 8/34 137/599.18 |
| 2006/0113836 A1* | 6/2006 | Nakamura | B60T 8/36 303/122.04 |
| 2012/0248862 A1* | 10/2012 | Ohnishi | B60T 13/745 303/20 |
| 2014/0008966 A1* | 1/2014 | Hotani | B60T 8/4081 303/14 |
| 2015/0084401 A1* | 3/2015 | Shimada | B60T 8/36 303/15 |
| 2015/0183414 A1* | 7/2015 | Kobayashi | B60T 13/662 303/3 |
| 2015/0274144 A1* | 10/2015 | Tokoi | B60T 7/042 303/3 |

FOREIGN PATENT DOCUMENTS

| | | |
|---|---|---|
| JP | 2013227011 | 11/2013 |
| JP | 2013227011 A * | 11/2013 |

OTHER PUBLICATIONS

European Search Report in related International Application No. 15160052.5, dated May 5, 2016.
m

* cited by examiner

BRAKE HYDRAULIC PRESSURE GENERATING DEVICE

CROSS-REFERENCE TO RELATED APPLICATION(S)

This application claims priority from Japanese Patent Application No. 2014-068211 filed on Mar. 28, 2014, the entire contents of which are incorporated herein by reference.

FIELD

An embodiment described herein generally relates to a brake hydraulic pressure generating device for use in a vehicle brake system.

BACKGROUND

Some kind of brake hydraulic pressure generating device has a master cylinder, a slave cylinder using a motor as a driving source, and a stroke simulator.

The aforementioned brake hydraulic pressure generating device includes a main hydraulic pressure passage for communication between the master cylinder and each wheel cylinder, a branch hydraulic pressure passage branched from the main hydraulic pressure passage and reaching the stroke simulator, and an on/off valve for opening/closing the branch hydraulic pressure passage.

The aforementioned on/off valve is a normally closed type solenoid valve. As such an on/off valve, there is an on/off valve provided with a first valve mechanism and a second valve mechanism (for example, see JP-2013-227011-A).

In the aforementioned on/off valve having two valve mechanisms, a first valve portion of the first valve mechanism is provided in a movable core, and a first valve seat of the first valve mechanism is formed in a second valve portion of the second valve mechanism.

When the movable core is attracted to a fixed core in the aforementioned on/off valve, the first valve portion leaves the first valve seat so as to allow brake fluid to flow from the main hydraulic pressure passage to the stroke simulator.

When the movable core approaches the fixed core, the second valve portion is pulled up by a retention member attached to the movable core. Thus, the second valve portion leaves a second valve seat so as to increase the flow rate of the brake fluid flowing from the main hydraulic pressure passage to the stroke simulator.

The aforementioned brake hydraulic pressure generating device has a configuration as follows. That is, when a brake pedal is operated, the first valve mechanism is opened so that a small amount of brake fluid can flow to reduce the differential pressure between the brake hydraulic pressure on the master cylinder side and the brake hydraulic pressure on the stroke simulator side. On this occasion, the second valve mechanism is opened to increase the flow rate of the brake fluid.

In the aforementioned brake hydraulic pressure generating device, the first valve portion is separated from the first valve seat by the movable core, and the second valve portion is separated from the second valve seat by the same movable core. This configuration must have a space which is large enough for the movable core to make a stroke to open both the first valve mechanism and the second valve mechanism. Therefore, due to increase in the moving amount of the movable core, the on/off valve may increase in size.

In addition, the flow rate in the on/off valve changes in two steps when the brake pedal is stepped down. Therefore, operation feeling of the brake pedal may change.

SUMMARY

One object of the invention is to provide a brake hydraulic pressure generating device capable of miniaturizing an on/off value and improving the operation feeling of a brake operator.

The present invention at least provides configurations of following Aspects 1 to 4. Numerals etc. in the brackets indicate exemplary correspondence with the reference signs used in the embodiments.

Aspect 1 provides a brake hydraulic pressure generating device, including:

a master cylinder (1) which is operated by operation of a brake operator (P);

a stroke simulator (2) which provides a pseudo operational force to the brake operator (P);

a main hydraulic pressure passage (9a, 9b) which communicates between the master cylinder (1) and a wheel cylinder (W);

a branch hydraulic pressure passage (9e, 9f, 9g) which is branched from the main hydraulic pressure passage (9a, 9b) and reaches the stroke simulator (2); and an on/off valve (6) which opens/closes the branch hydraulic pressure passage (9e, 9f, 9g), wherein the on/off valve (6) includes a first valve mechanism (10) including
  a first valve portion (11) and
  a first valve seat (22) which has an annular shape and receives the first valve portion (11), and
a second valve mechanism (20) including
  a second valve portion (21) which has a cylindrical shape, the first valve seat (22) being formed in the second valve portion (21) is formed and
  a second valve seat (71) which has an annular shape and receives the second valve portion (21), wherein a pressure receiving area in which brake hydraulic pressure acting from the stroke simulator side (9g) is received is set to be higher in the second valve portion (21) than in the first valve portion (11), wherein, when brake hydraulic pressure on the master cylinder side (9f) is higher than brake hydraulic pressure on the stroke simulator side (9g), the first valve portion (11) is separated from the first valve seat (22) so as to allow brake fluid to flow from the main hydraulic pressure passage (9a, 9b) to the stroke simulator (2) through the first valve mechanism (10), and wherein, when brake hydraulic pressure on the stroke simulator side (9g) is higher than brake hydraulic pressure on the master cylinder side (9f), the second valve portion (21) is separated from the second valve seat (71) due to brake hydraulic pressure acting on the second valve portion (21) from the stroke simulator side (9g), so as to allow brake fluid to flow from the stroke simulator (2) to the main hydraulic pressure passage (9a, 9b) through the second valve mechanism (20).

According to the above configuration, only the first valve mechanism is opened when the brake fluid is allowed to flow from the main hydraulic pressure passage to the stroke simulator. The on/off valve can be miniaturized due to the configuration in which it will go well as long as clearance corresponding to a stroke amount large enough to open only the first valve mechanism can be secured when the brake fluid is allowed to flow from the main hydraulic pressure passage to the stroke simulator.

Only the first valve mechanism is opened when the brake fluid flows from the main hydraulic pressure passage to the stroke simulator while only the second valve mechanism is opened when the brake fluid flows from the stroke simulator to the main hydraulic pressure passage. Accordingly, the flow rate of the brake fluid can be prevented from changing when the on/off valve is opened. Thus, it is possible to improve the operation feeling of the brake operator.

The second valve portion is formed to be larger in diameter than the first valve portion because the first valve seat is formed in the second valve portion. Accordingly, when the brake fluid flows from the stroke simulator to the main hydraulic pressure passage, the second valve portion which is larger in diameter than the first valve portion leaves the second valve seat so that the flow rate of the brake fluid can increase. As a result, when an input to the brake operator is canceled, the brake fluid can be smoothly put back from the stroke simulator to the main hydraulic pressure passage.

Aspect 2 provides, based on Aspect 1,
the brake hydraulic pressure generating device,
wherein the on/off valve (6) is a solenoid valve including a fixed core (50) and a movable core (40) in which the first valve portion (11) is provided,
wherein a retention member (12) which retains the second valve portion (21) is attached to the movable core (40),
wherein the retention member (12) can move relatively to the second valve portion (21), and
wherein a distance (L1) between the movable core (40) and the fixed core (50) in a state where the first valve mechanism (10) and the second valve mechanism (20) are closed is set so that the first valve portion (11) can leave the first valve seat (22) and the second valve portion (21) can be seated on the second valve seat (71) when the movable core (40) abuts against the fixed core (50).

According to the above configuration, only the first valve mechanism is opened when the brake fluid is allowed to flow from the main hydraulic pressure passage to the stroke simulator. The second valve portion does not have to be pulled up by the movable core. Thus, the moving amount of the movable core can be reduced. It is therefore possible to reduce the distance between the movable core and the fixed core in the state where the on/off valve is closed.

As a result, the attraction force with which the fixed core should attract the movable core can be reduced when the first valve mechanism is opened. Thus, the amount of an electric current applied to the solenoid coil in order to excite the fixed core can be reduced. It is therefore possible to miniaturize the solenoid coil, so that the brake hydraulic pressure generating device can be miniaturized and the manufacturing cost thereof can be reduced.

Aspect 3 provides, based on Aspect 2,
the brake hydraulic pressure generating device,
wherein the retention member (12) is formed into a cylindrical shape;
wherein a part of the second valve portion (21) is inserted into the retention member (12); and
wherein an engagement portion (12b) which forms a stopper for preventing the second valve portion (21) from falling out is formed in the retention member (12).

According to the above configuration, the second valve portion moves while being guided by the retention member when the second valve mechanism is opened and closed. Thus, the second valve mechanism can be opened and closed stably.

The second valve portion is retained by the movable core. Accordingly, the second valve portion can be attached to another component together with the movable core when the on/off valve is manufactured. Thus, the workability can be improved.

Aspect 3 provides, based on any one of Aspects 1 to 3, the brake hydraulic pressure generating device,
wherein the second valve portion (21) leaves the second valve seat (71) when brake hydraulic pressure not lower than a predetermined pressure acts on the second valve portion (21) from the stroke simulator side (9g) in a state where the first valve mechanism (10) and the second valve mechanism (20) are closed.

In the above configuration, the second valve portion leaves the second valve portion when the brake hydraulic pressure on the stroke simulator side rises to at least a predetermined pressure, for example, due to a temperature change or the like in a surrounding environment of the brake hydraulic pressure generating device in the state where the first valve mechanism and the second valve mechanism are closed. Thus, the brake fluid can be smoothly released from the stroke simulator to the main hydraulic pressure passage.

According to the above configuration, clearance corresponding to a stroke amount large enough to open only the first valve mechanism is secured when the brake fluid flows from the main hydraulic pressure passage to the stroke simulator. Due to this configuration, it is possible to miniaturize the on/off valve while it is possible to improve the operation feeling of the brake operator. In addition, the brake fluid in the stroke simulator can be allowed to flow out smoothly when an input to the brake operator is canceled.

DETAILED DESCRIPTION

Figure 1:
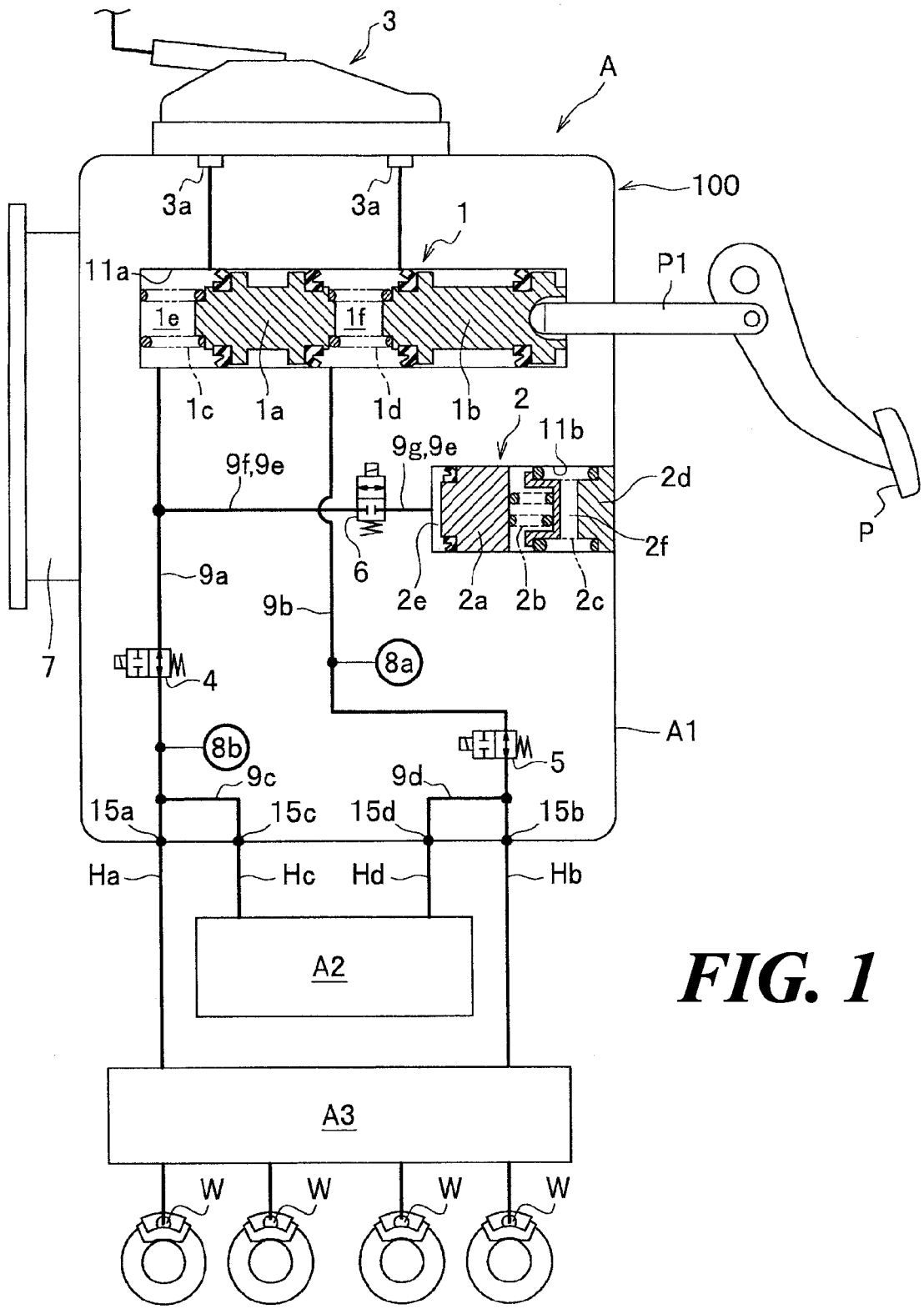
FIG. 1 is a hydraulic pressure circuit diagram showing a vehicle brake system using a brake hydraulic pressure generating device according to an embodiment.

In this embodiment, a brake hydraulic pressure generating device will be described along an example in which it is applied to a vehicle brake system A shown in FIG. 1.

The vehicle brake system A includes both a by-wire type brake system which operates when a motor (such as an engine or an electric motor) starts up and a hydraulic type brake system which operates in such a case that the motor stops.

The vehicle brake system A can be mounted on a hybrid car using an engine (internal combustion engine) and a motor as power sources, an electric car or a fuel cell car using only a motor as a power source, etc. as well as a car using only an engine as a power source.

The vehicle brake system A has a brake hydraulic pressure generating device A1 which generates brake hydraulic pressure in accordance with the operation quantity of a brake pedal (brake operator) P.

The vehicle brake system A has a slave cylinder A2 which drives a motor (electric actuator) in accordance with the operation quantity of the brake pedal P so as to generate brake hydraulic pressure.

Further, the vehicle brake system A has a hydraulic pressure control device A3 which assists in stabilizing the behavior of the vehicle.

The brake hydraulic pressure generating device A1, the slave cylinder A2 and the hydraulic pressure control device A3 are constituted as different units, which communicate with one another through external pipe arrangements.

The brake hydraulic pressure generating device A1 has a base 100, a master cylinder 1 which operates in accordance with the operation of the brake pedal P, a stroke simulator 2 which gives a pseudo operational reaction to the brake pedal P, and an electronic control device 7.

The base 100 is a metal component mounted on the vehicle. Two cylinder holes 11a and 11b and plural hydraulic pressure passages 9a to 9e are formed in the base 100. Various components including a reservoir 3 are attached to the base 100.

The master cylinder 1 is a tandem piston type one, which is constituted by two pistons 1a and 1b and two coil springs 1c and 1d. The master cylinder 1 is provided in the first cylinder hole 11a which has a cylindrical shape with a bottom.

A first pressure chamber 1e is formed between the bottom surface of the first cylinder hole 11a and the secondary piston 1a. The first coil spring 1c is received in the first pressure chamber 1e. The first coil spring 1c pushes the secondary piston 1a, which has moved to the bottom surface side, back to the opening portion side.

A second pressure chamber 1f is formed between the secondary piston 1a and the primary piston 1b. The second coil spring 1d is received in the second pressure chamber 1f. The second coil spring 1d pushes the secondary piston 1a, which has moved to the bottom surface side, back to the opening portion side.

A rod P1 of the brake pedal P is inserted into the first cylinder hole 11a. A front end portion of the rod P1 is connected to the primary piston 1b. Thus, the primary piston 1b is connected to the brake pedal P through the rod P1.

The secondary piston 1a and the primary piston 1b slide inside the first cylinder hole 11a and toward the bottom surface in response to a stepping force on the brake pedal P, so as to apply pressure to brake fluid in the two pressure chambers 1e and 1f.

The reservoir 3 is a vessel for reserving the brake fluid. The reservoir 3 is attached to the top surface of the base 100. The brake fluid can be supplied from the reservoir 3 to the two pressure chambers 1e and 1f through communication holes 3a and 3a.

The stroke simulator 2 is constituted by a piston 2a, two coil springs 2b and 2c, and a cover member 2d. The stroke simulator 2 is provided in the second cylinder hole 11b which has a cylindrical shape with a bottom. The opening portion of the second cylinder hole 11b is closed with the cover member 2d.

A pressure chamber 2e is formed between the bottom surface of the second cylinder hole 11b and the piston 2a. A reception chamber 2f is formed between the piston 2a and the cover member 2d. The two coil springs 2b and 2c are received in the reception chamber 2f. The two coil springs 2b and 2c push the piston 2a, which has moved to the cover member 2d side, back to the bottom surface side, while giving an operational reaction to the brake pedal P.

Next, the respective hydraulic pressure passages formed in the base 100 will be described.

The first main hydraulic pressure passage 9a is a hydraulic pressure passage starting at the first pressure chamber 1e of the first cylinder hole 11a. A pipe arrangement Ha reaching the hydraulic pressure control device A3 is connected to an output port 15a which is an ending point of the first main hydraulic pressure passage 9a.

The second main hydraulic pressure passage 9b is a hydraulic pressure passage starting at the second pressure chamber 1f of the first cylinder hole 11a. A pipe arrangement Hb reaching the hydraulic pressure control device A3 is connected to an output port 15b which is an ending point of the second main hydraulic pressure passage 9b.

The communication hydraulic pressure passages 9c and 9d are hydraulic pressure passages extending from input ports 15c and 15d to the main hydraulic pressure passages 9a and 9b respectively. Pipe arrangements Hc and Hd reaching the slave cylinder A2 are connected to the input ports 15c and 15d respectively.

The branch hydraulic pressure passage 9e is a hydraulic pressure passage branched from the first main hydraulic pressure passage 9a and reaching the pressure chamber 2e of the stroke simulator 2. The branch hydraulic pressure passage 9e is open in the bottom surface of the second cylinder hole 11b.

In the first main hydraulic pressure passage 9a, a first changeover valve 4 for opening/closing the first main hydraulic pressure passage 9a is provided on the downstream side (output port 15a side) of a connection part with the branch hydraulic pressure passage 9e. The first changeover valve 4 is a normally open type solenoid valve, which is a master cut valve for cutting off the first main hydraulic pressure passage 9a between its upstream side and its downstream side when the first changeover valve 4 is changed over to be closed.

In the second main hydraulic pressure passage 9b, a second changeover valve 5 for opening/closing the second main hydraulic pressure passage 9b is provided. The second changeover valve 5 is a normally open type solenoid valve, which is a master cut valve for cutting off the second main hydraulic pressure passage 9b between its upstream side and its downstream side when the second changeover valve 5 is changed over to be closed.

In the branch hydraulic pressure passage 9e, an on/off valve 6 which is a normally closed type solenoid valve is provided. The on/off valve 6 opens/closes the branch hydraulic pressure passage 9e. In the branch hydraulic pressure passage 9e, a simulator side hydraulic pressure passage 9g extending from the on/off valve 6 to the stroke simulator 2 and a master cylinder side hydraulic pressure passage 9f extending from the on/off valve 6 to the first main hydraulic pressure passage 9a are provided to be separated by the on/off valve 6.

Two pressure sensors 8a and 8b detect magnitude of brake hydraulic pressure. Information acquired by the two pressure sensors 8a and 8b is supplied to the electronic control device 7.

The first pressure sensor 8a is provided in the second main hydraulic pressure passage 9b. The first pressure sensor 8a is disposed on the upstream side (master cylinder 1 side) of the second changeover valve 5. The first pressure sensor 8a detects brake hydraulic pressure generated in the master cylinder 1.

The second pressure sensor 8b is provided in the first main hydraulic pressure passage 9a. The second pressure sensor 8b is disposed on the downstream side (output port 15a side)

of the first changeover valve 4. The second pressure sensor 8b detects brake hydraulic pressure generated in the slave cylinder A2.

The electronic control device 7 makes control to open/close the two changeover valves 4 and 5 and the on/off valve 6 based on information obtained from various sensors including the two pressure sensors 8a and 8b and a stroke sensor, programs stored in advance, etc.

Though not shown, the slave cylinder A2 has a slave piston which slides inside a cylinder hole, an actuator mechanism which has a motor and a driving force transmission portion, and an electronic control device.

In the slave cylinder A2, the driving force transmission portion converts a rotational driving force of the motor into forward/backward movement, and transmits the forward/backward movement to the slave piston. Thus, the slave piston slides insides the cylinder hole so as to apply pressure to the brake fluid in the cylinder hole. The brake hydraulic pressure generated in the slave cylinder A2 is inputted to the brake hydraulic pressure generating device A1 through the pipe arrangements Hc and Hd.

The hydraulic pressure control device A3 has a configuration capable of timely controlling brake hydraulic pressure applied to respective wheel cylinders W of wheel brakes to thereby execute antilock brake control, sideslip prevention control and traction control for stabilizing the behavior of the vehicle, etc.

Though not shown, the hydraulic pressure control device A3 has a hydraulic pressure unit provided with an solenoid valve, a pump, etc., a motor for driving the pump, an electronic control unit for controlling the solenoid valve, the motor, etc., and so on.

The hydraulic pressure control device A3 is connected to the brake hydraulic pressure generating device A1 through the pipe arrangements Ha and Hb, and also connected to the wheel cylinders W through pipe arrangements.

Next, the operation of the vehicle brake system A will be described schematically.

In the vehicle brake system A, the electronic control device 7 changes over both the changeover valves 4 and 5 to a closed state as soon as the stroke sensor detects that the brake pedal P has been operated. Thus, both the main hydraulic pressure passages 9a and 9b are cut off between their upstream side and their downstream side.

The electronic control device 7 opens the on/off valve 6. Thus, the brake fluid can flow into the stroke simulator 2 from the first main hydraulic pressure passage 9a through the branch hydraulic pressure passage 9e.

In response to the stepping force on the brake pedal P, the two pistons 1a and 1b of the master cylinder 1 slide toward the bottom surface inside the first cylinder hole 11a so as to apply pressure to the brake fluid in the two pressure chambers 1e and 1f. Since the two main hydraulic pressure passages 9a and 9b are cut off between their upstream side and their downstream side, the brake hydraulic pressure generated in the two pressure chambers 1e and 1f is not transmitted to any wheel cylinder W.

When pressure is applied to the brake fluid in the first pressure chamber 1e, the brake fluid flows into the branch hydraulic pressure passage 9e from the first main hydraulic pressure passage 9a. Then, pressure is applied to the brake fluid in the pressure chamber 2e of the stroke simulator 2 so that the piston 2a can move against the urging force of the coil springs 2b and 2c and toward the cover member 2d.

As a result, the brake pedal P makes a stroke, and an urging force toward the bottom surface is generated in the piston 2a by the coil springs 2b and 2c so that a pseudo operational reaction can be given to the brake pedal P from the piston 2a.

When the stroke sensor detects that the brake pedal P has been stepped down, the motor of the slave cylinder A2 is driven.

In the slave cylinder A2, brake hydraulic pressure outputted from the slave cylinder A2 (brake hydraulic pressure detected by the second pressure sensor 8b) is compared with brake hydraulic pressure outputted from the master cylinder 1 (brake hydraulic pressure detected by the first pressure sensor 8a), and the rotating speed of the motor, etc., are controlled based on a result of the comparison. In this manner, in the slave cylinder A2, brake hydraulic pressure is generated in accordance with the operation quantity of the brake pedal P.

The brake hydraulic pressure generated in the slave cylinder A2 is supplied to the brake hydraulic pressure generating device A1 through the pipe arrangements Hc and Hd, and supplied to the hydraulic pressure control device A3 through the communication hydraulic pressure passages 9c and 9d, the two main hydraulic pressure passages 9a and 9b and the pipe arrangements Ha and Hb.

Further, the brake hydraulic pressure is transmitted from the hydraulic pressure device A3 to each wheel cylinder W. Each wheel cylinder W is operated to give a braking force to each wheel.

In the state where the slave cylinder A2 is not operated (for example, when electric power cannot be obtained), the two changeover valves 4 and 5 are open, and the upstream side and the downstream side communicate with each other in the two main hydraulic pressure passages 9a and 9b. The on/off valve 6 is closed.

In this state, the brake hydraulic pressure in the two main hydraulic pressure passages 9a and 9b is increased by the master cylinder 1. Thus, the wheel cylinders W communicating with the two main hydraulic pressure passages 9a and 9b are increased in pressure to thereby apply a braking force to each wheel.

Next, a specific configuration of the on/off valve 6 according to the embodiment will be described.

Figure 2:
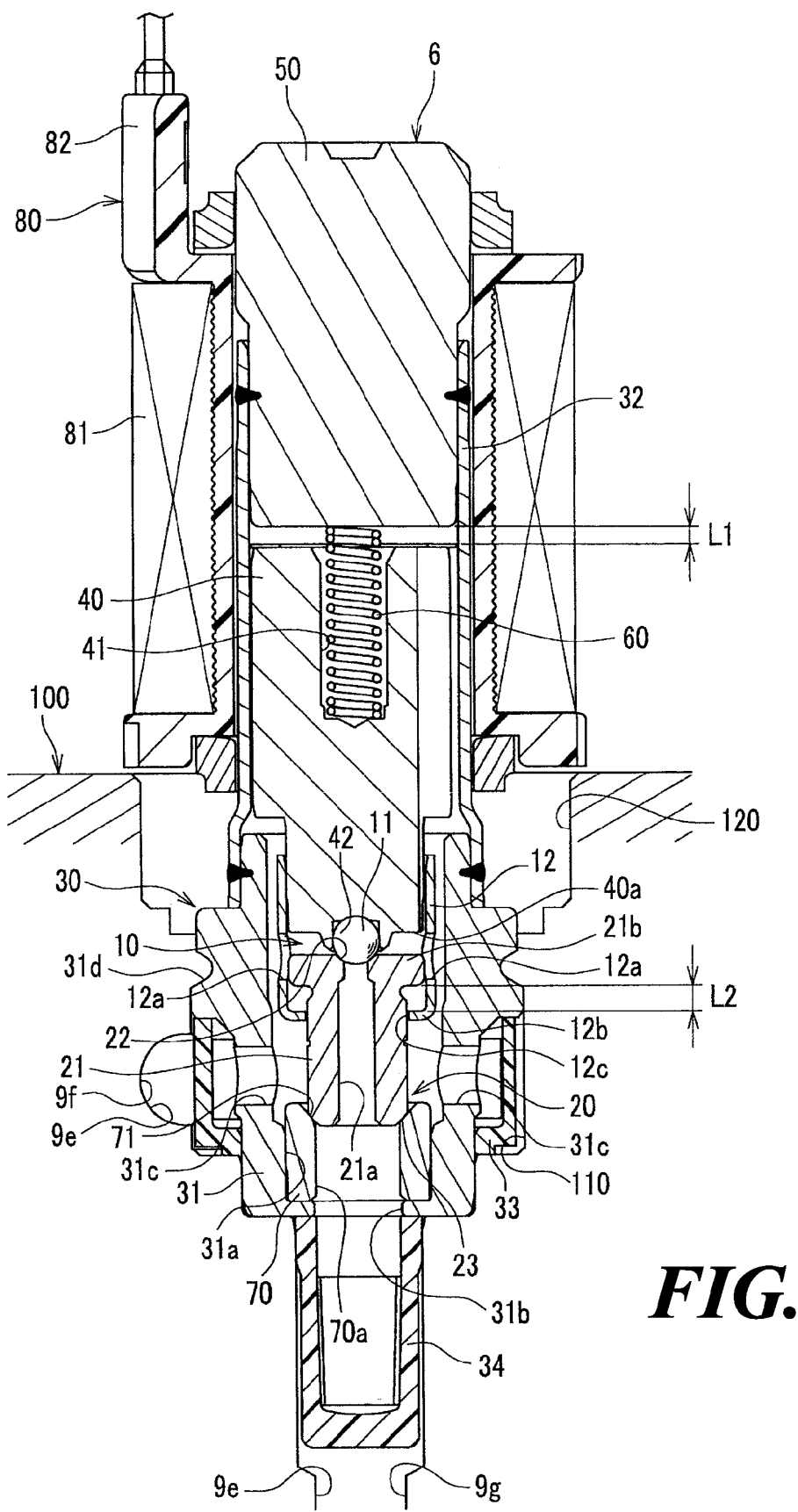
FIG. 2 is a side sectional view showing a state in which an on/off valve according to the embodiment has been attached to a base.

The on/off valve 6 is a normally closed type solenoid valve, which is mounted into a mounting hole 110 formed in the base 100, as shown in FIG. 2. The mounting hole 110 is a cylindrical hole with a bottom, which hole is opened in the bottom surface of a recess portion 120 formed in the surface of the base 100.

The simulator side hydraulic pressure passage 9g of the branch hydraulic pressure passage 9e is opened in the bottom surface of the mounting hole 110. The master cylinder side hydraulic pressure passage 9f of the branch hydraulic pressure passage 9e is opened in the inner circumferential surface of the mounting hole 110.

The on/off valve 6 has a valve housing 30, a first valve mechanism 10 and a second valve mechanism 20. The first valve mechanism 10 and the second valve mechanism 20 are provided in the valve housing 30. Further, the on/off valve 6 has a movable core 40, a fixed core 50 and a coil spring 60. The movable core 40 is provided in the valve housing 30. The fixed core 50 is fixed to the valve housing 30. The coil spring 60 is provided between the movable core 40 and the fixed core 50.

The valve housing 30 has an insertion portion 31 and a protrusion portion 32. The insertion portion 31 is mounted into the mounting hole 110. The protrusion portion 32 protrudes from the mounting hole 110.

The insertion portion 31 is a member having a cylindrical shape with a bottom and made from metal. A center hole 31a having a circular shape in section penetrates the center portion of the insertion portion 31 axially. A first port 31b communicating with the simulator side hydraulic pressure passage 9g is opened in the bottom portion of the insertion portion 31.

Plural second ports 31c penetrate the peripheral wall of the insertion portion 31 axially. The master cylinder side hydraulic pressure passage 9f and the center hole 31a communicate with each other through the second ports 31c.

A first filter 33 having a cylindrical shape and disposed to cover the opening portions of the second ports 31c is externally fitted to the side surface of the insertion portion 31.

An upper end portion of a second filter 34 having a cylindrical shape and pressed into the simulator side hydraulic pressure passage 9g abuts against the lower surface of the insertion portion 31.

A mounting groove 31d is formed all over the circumference of an upper portion of the outer circumferential surface of the insertion portion 31. An opening edge portion of the mounting hole 110 opened in the bottom surface of the recess portion 120 is plastically deformed so that a part of the inner circumferential surface of the mounting hole 110 can enter the mounting groove 31d. Thus, the insertion portion 31 is fixed into the mounting hole 110.

The lower end portion of the cylindrical protrusion portion 32 is externally fitted to the upper end portion of the insertion portion 31. The insertion portion 31 and the protrusion portion 32 are connected by welding.

The fixed core 50 is internally fitted to the upper end portion of the protrusion portion 32. The fixed core 50 is made from a magnetic material such as iron or an iron alloy. The protrusion portion 32 and the fixed core 50 are connected by welding.

Inside the protrusion portion 32, the movable core 40 is disposed under the fixed core 50 (on the insertion portion 31 side). The movable core 40 is made from a magnetic material such as iron or an iron alloy. The movable core 40 is inserted into the protrusion portion 32 movably in the axial direction.

A spring mounting hole 41 having a cylindrical shape with a bottom is formed in the center portion of the upper surface (end surface on the fixed core 50 side) of the movable core 40. The coil spring 60 is inserted into the spring mounting hole 41.

The upper end portion of the coil spring 60 protrudes from the spring mounting hole 41. The coil spring 60 is put between the movable core 40 and the fixed core 50 so as to be compressed. The movable core 40 is pushed down by the urging force of the coil spring 60 so as to leave the fixed core 50.

A first valve portion 11 is retained in the lower end surface of the movable core 40. The first valve portion 11 is a sphere made from metal. The first valve portion 11 is inserted into a recess portion 42 formed in the lower end surface of the movable core 40. In the state where a part of the first valve portion 11 protrudes from the recess portion 42, the periphery of the recess portion 42 is plastically deformed toward the first valve portion 11 so that the first valve portion 11 can be retained by the movable core 40.

A retention member 12 having a cylindrical shape with a bottom is attached to the lower end portion of the movable core 40. The retention member 12 is a member made from metal and provided for retaining a second valve portion 21.

The upper end opening portion of the retention member 12 is externally fitted to the lower end portion of the movable core 40. The upper surface of a bottom plate 12b of the retention member 12 is disposed at a distance from the lower end surface 40a of the movable core 40 in the up/down direction (the moving direction of the movable core 40).

Plural communication holes 12a penetrate the side circumferential wall of the retention member 12 axially. Each communication hole 12a is disposed under the lower end surface 40a of the movable core 40.

An opening portion 12c penetrates the center portion of the bottom plate 12b of the retention member 12. The second valve portion 21 is inserted into the opening portion 12c of the bottom plate 12b.

The second valve portion 21 is a cylindrical member. A flow channel 21a having a circular shape in section penetrates the center portion of the second valve portion 21 axially. A flange portion 21b protrudes in the upper end portion of the second valve portion 21 radially. That is, the upper end portion of the second valve portion 21 is made larger in diameter than any other part of the second valve portion 21. The flange portion 21b is made larger in diameter than the opening portion 12c of the retention member 12.

The second valve portion 21 is inserted into the opening portion 12c of the bottom plate 12b of the retention member 12 from the internal side of the retention member 12. The upper portion (flange portion 21b) of the second valve portion 21 is received in the retention member 12, and the lower portion of the second valve portion 21 protrudes downward from the retention member 12.

Since the flange portion 21b of the second valve portion 21 is made larger in diameter than the opening portion 12c of the retention member 12, the lower surface of the flange portion 21b abuts against the upper surface of the bottom plate 12b of the retention member 12. Thus, the second valve portion 21 is designed to be prevented from falling out downward from the retention member 12 when the on/off valve 6 is manufactured.

In this manner, a stopper for the second valve portion 21 is constituted by the bottom plate 12b of the retention member 12. The stopper may be referred to as an engagement portion.

In the upper end surface of the second valve portion 21, a first valve seat 22 having a funnel-like (tapered) shape is formed in the opening edge portion of the flow channel 21a. The first valve seat 22 is a part where the first valve portion 11 should be seated.

The diameter of the lower portion of the second valve portion 21 is reduced gradually as goes toward its lower end surface. Thus, a tapered contact surface 23 is formed in the outer circumferential edge portion of the lower end surface of the second valve portion 21.

A cylindrical valve seat member 70 is internally fitted to the bottom portion located inside the insertion portion 31 of the valve housing 30. A flow channel 70a penetrates the center portion of the valve seat member 70 axially. The flow channel 70a of the valve seat member 70 communicates with the first port 31b of the valve housing 30.

In the upper end surface of the valve seat member 70, a second valve seat 71 having a funnel-like (tapered) shape is formed in the opening edge portion of the flow channel 70a. The second valve seat 71 is a part where the contact surface 23 of the second valve portion 21 should be seated.

The first valve mechanism 10 is constituted by the first valve portion 11 which is provided in the movable core 40 and the first valve seat 22 which is formed in the second valve portion 21. When the first valve portion 11 is seated on the first valve seat 22, the first valve mechanism 10 is closed. On the contrary, when the first valve portion 11 leaves the first valve seat 22, the first valve mechanism 10 is opened (see FIG. 3).

The second valve mechanism 20 is constituted by the second valve portion 21 and the second valve seat 71 which is formed in the valve seat member 70. When the second valve portion 21 is seated on the second valve seat 71, the second valve mechanism 20 is closed. On the contrary, when the second valve portion 21 leaves the second valve seat 71, the second valve mechanism 20 is opened (see FIG. 4).

In the state where the first valve portion 11 is seated on the first valve seat 22, the sectional area of a part where the first valve portion 11 abuts against the first valve seat 22 corresponds to a pressure receiving area where brake hydraulic pressure acting from the first port 31b side is received.

In the state where the second valve portion 21 is seated on the second valve seat 71, the sectional area of a part where the second valve portion 21 abuts against the second valve seat 71 corresponds to a pressure receiving area where brake hydraulic pressure acting from the first port 31b side is received.

The on/off valve 6 is formed so that the inner diameter of the flow channel 70a of the valve seat member 70 is larger than the inner diameter of the flow channel 21a of the second valve portion 21. Accordingly, the pressure receiving area where brake hydraulic pressure acting from the first port 31b side is received is set to be higher in the second valve portion 21 than in the first valve portion 11.

In the on/off valve 6, in the state where the first valve mechanism 10 and the second valve mechanism 20 are closed, a distance L1 between the fixed core 50 and the movable core 40 is set to be smaller than a distance L2 between the lower surface of the flange portion 21b of the second valve portion 21 and the upper surface of the bottom plate 12b of the retention member 12 (L1<L2).

In the aforementioned on/off valve 6, an solenoid coil 80 for driving the on/off valve 6 is disposed around a part which protrudes from the surface of the base 100.

The solenoid coil 80 has a bobbin 82 made from resin. A winding wire 81 is wound around the bobbin 82. The upper portion of the on/off valve 6 is inserted into the bobbin 82. When an electric current is applied to the winding wire 81 from a not-shown control board, a magnetic field is generated around the on/off valve 6.

In the on/off valve 6, in the state where the solenoid coil 80 has been demagnetized, the movable core 40 is pushed down relatively to the fixed core 50 by the urging force of the coil spring 60 so that the first valve 11 is seated on the first valve seat 22. Thus, the flow channel 21a of the second valve portion 21 is closed so that the first valve mechanism 10 can be closed.

Further, in the state where the solenoid coil 80 has been demagnetized, the second valve portion 21 is also pushed down relatively to the fixed core 50 by the urging force of the coil spring 60 so that the second valve portion 21 is seated on the second valve seat 71. Thus, the flow channel 70a of the valve seat member 70 is closed so that the second valve mechanism 20 can be closed.

In this manner, in the state where the solenoid coil 80 has been demagnetized, the first valve mechanism 10 and the second valve mechanism 20 of the on/off valve 6 are closed.

Figure 3:
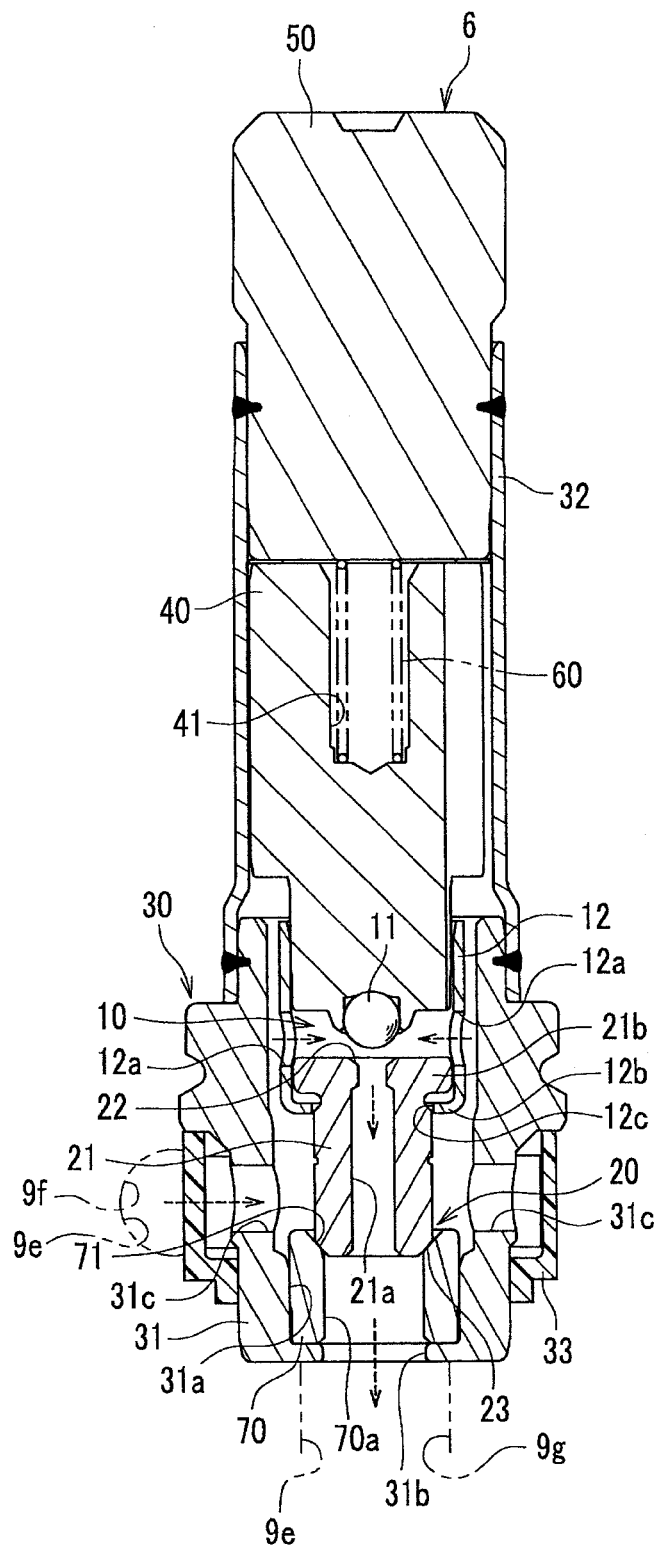
FIG. 3 is a side sectional view showing a state in which a first valve mechanism has been opened in the on/off valve according to the embodiment.

In the vehicle brake system A shown in FIG. 1, assume that the stroke sensor detects that the brake pedal P has been operated, and an electric current is applied from the control board of the electronic control device 7 to the solenoid coil 80 (see FIG. 2) of the on/off valve 6. On this occasion, the fixed core 50 is excited as shown in FIG. 3.

An electric current may be applied to the solenoid coil 80 (see FIG. 2) by the electronic control device 7 as soon as an ignition switch of the vehicle is turned ON.

In this manner, the movable core 40 is attracted by the fixed core 50 so that the movable core 40 can move against the urging force of the coil spring 60 and toward the fixed core 50. Thus, the first valve portion 11 leaves the first valve seat 22 to open the first valve mechanism 10.

When the movable core 40 moves toward the fixed core 50, the retention member 12 moves toward the fixed core 50 relatively to the second valve portion 21. As shown in FIG. 2, in the state where the first valve mechanism 10 and the second valve mechanism 20 are closed, the distance L2 between the flange portion 21b of the second valve portion 21 and the bottom plate 12b of the retention member 12 is set to be larger than the distance L1 between the fixed core 50 and the movable core 40. Accordingly, even when the movable core 40 abuts against the fixed core 50, there is a distance between the flange portion 21b of the second valve portion 21 and the bottom plate 12b of the retention member 12, as shown in FIG. 3.

In the on/off valve 6, when the fixed core 50 is excited, the first valve portion 11 leaves the first valve seat 22 to open the first valve mechanism 10. On the other hand, brake hydraulic pressure from the second port 31c side (master cylinder 1 side, see FIG. 1) acts on the second valve portion 21 so that the second valve portion 21 can be seated on the second valve seat 71 by the brake hydraulic pressure. Thus, the second valve mechanism 20 is closed.

In this embodiment, as shown in FIG. 2, the distance L2 between the lower surface of the flange portion 21b of the second valve portion 21 and the upper surface of the bottom plate 12b of the retention member 12 is set to be larger than the distance L1 between the fixed core 50 and the movable core 40 (L1<L2). In this manner, the second valve mechanism 20 is designed to be prevented from being opened together with the first valve mechanism 10 when the movable core 40 moves toward the fixed core 50 to open the first valve mechanism 10.

When the first valve mechanism 10 is opened, the brake fluid is allowed to flow from the second ports 31c on the first main hydraulic pressure passage 9a (see FIG. 1) side to the first port 31b on the stroke simulator 2 (see FIG. 1) side.

In the vehicle brake system A shown in FIG. 1, assume that an input to the brake pedal P is cancelled. On this occasion, the brake fluid in the stroke simulator 2 is pushed out to the branch hydraulic pressure passage 9e by the piston 2a. Thus, the brake hydraulic pressure in the simulator side hydraulic pressure passage 9g becomes higher than the brake hydraulic pressure in the master cylinder side hydraulic pressure passage 9f.

Figure 4:
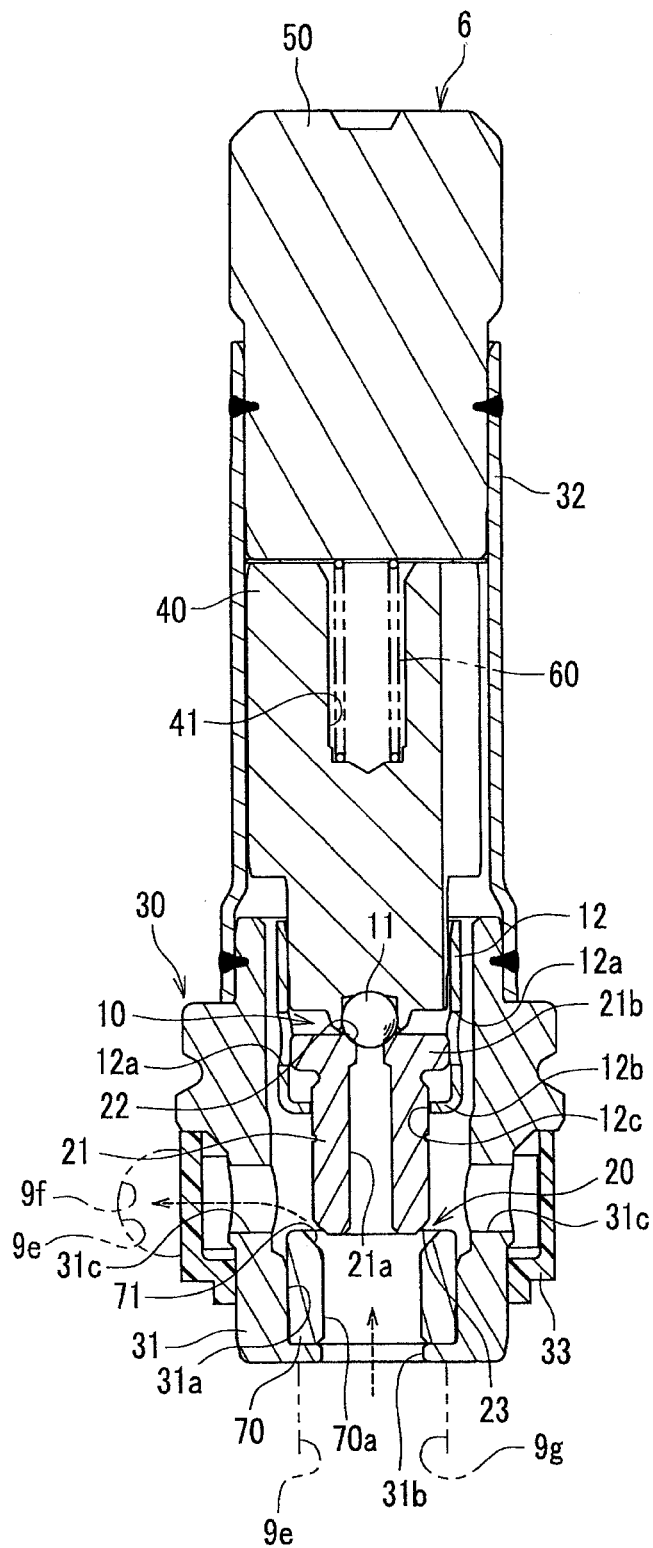
FIG. 4 is a side sectional view showing a state in which a second valve mechanism has been opened in the on/off valve according to the embodiment.

On this occasion, in the on/off valve 6, as shown in FIG. 4, the fixed core 50 is excited by the solenoid coil 80 so that the second valve portion 21 can be pushed up toward the movable core 40 by the brake hydraulic pressure acting on the second valve portion 21 from the first port 31b side while the movable core 40 is kept in contact with the fixed core 50. As a result, the second valve portion 21 leaves the second valve seat 71 to open the second valve mechanism 20.

When the second valve mechanism 20 is opened, the brake fluid is allowed to flow from the first port 31b on the stroke simulator 2 (see FIG. 1) side to the second ports 31c on the first main hydraulic pressure passage 9a (see FIG. 1) side.

In the on/off valve 6, when brake hydraulic pressure on the first port 31*b* side reaches at least a predetermined pressure in the state where the first valve mechanism 10 and the second valve mechanism 20 are closed as shown in FIG. 2, the second valve portion 21 moves toward the fixed core 50 due to the brake hydraulic pressure as shown in FIG. 4. On this occasion, the second valve portion 21 moves against the urging force of the coil spring 60 and toward the fixed core 50 together with the movable core 40.

In the on/off valve 6, the pressure receiving area where brake hydraulic pressure acting from the stroke simulator 2 (see FIG. 1) side is received is set to be higher in the second valve portion 21 than in the first valve portion 11.

Accordingly, when brake hydraulic pressure not lower than the predetermined pressure acts on the first valve portion 11 and the second valve portion 21 from the second port 31*c* side, the second valve portion 21 moves earlier than the first valve portion 11 so that only the second valve mechanism 20 can be opened. In this manner, the brake fluid is allowed to flow from the first port 31*b* to the second ports 31*c*.

In the brake hydraulic pressure generating device A1 configured thus, as shown in FIG. 2, the distance L2 between the lower surface of the flange portion 21*b* of the second valve portion 21 and the upper surface of the bottom plate 12*b* of the retention member 12 is set to be larger than the distance L1 between the fixed core 50 and the movable core 40 (L1<L2). In this manner, the brake hydraulic pressure generating device A1 has a configuration in which only the first valve mechanism 10 is opened when the movable core 40 is moved toward the fixed core 50 to allow the brake fluid to flow from the second ports 31*c* on the first main hydraulic pressure passage 9*a* (see FIG. 1) side to the first port 31*b* on the stroke simulator 2 (see FIG. 1) side as shown in FIG. 3. Accordingly, the on/off valve 6 can be miniaturized due to the configuration in which it will go well as long as clearance corresponding to a stroke amount large enough to open only the first valve mechanism 10 can be secured when the brake fluid is allowed to flow from the second ports 31*c* to the first port 31*b*.

The moving amount of the movable core 40 can be reduced. As shown in FIG. 1, it is therefore possible to reduce the distance L1 between the movable core 40 and the fixed core 50 in the state where the on/off valve 6 is closed.

As a result, in the on/off valve 6, it is possible to reduce the attraction force with which the fixed core 50 should attract the movable core 40 when the first valve mechanism 10 is opened. Thus, the amount of an electric current applied to the solenoid coil 80 in order to excite the fixed core 50 can be reduced. It is therefore possible to miniaturize the solenoid coil 80, so that the brake hydraulic pressure generating device A1 (see FIG. 1) can be miniaturized and the manufacturing cost thereof can be reduced.

In the on/off valve 6, only the first valve mechanism 10 is opened when the brake fluid flows from the second ports 31*c* to the first port 31*b* as shown in FIG. 3 while only the second valve mechanism 20 is opened when the brake fluid flows from the first port 31*b* to the second ports 31*c* as shown in FIG. 4. Accordingly, the flow rate of the brake fluid can be prevented from changing when the on/off valve 6 is opened. Thus, it is possible to improve the operation feeling of the brake pedal P.

In the on/off valve 6, the second valve portion 21 which is larger in diameter than the first valve portion 11 leaves the second valve seat 71 when the brake fluid flows from the first port 31*b* to the second ports 31*c*. Accordingly, the flow rate of the brake fluid in the on/off valve 6 can increase. As a result, when an input to the brake pedal P is canceled, the brake fluid can be smoothly put back into the first main hydraulic pressure passage 9*a* from the stroke simulator 2 shown in FIG. 1.

In the on/off valve 6, as shown in FIG. 4, the second valve portion 21 moves while being guided by the inner circumferential edge portion of the opening portion 12*c* of the retention member 12 when the second valve mechanism 20 is opened and closed. Thus, the second valve mechanism 20 can be opened and closed stably.

The second valve portion 21 is retained by the movable core 40 through the retention member 12. Accordingly, the second valve portion 21 can be attached to the valve housing 30 together with the movable core 40 when the on/off valve 6 is manufactured. Thus, the workability can be improved.

In the on/off valve 6, the brake hydraulic pressure in the first port 31*b* on the stroke simulator 2 (see FIG. 1) side may increase due to a temperature change or the like in the surrounding environment in the state where the first valve mechanism 10 and the second valve mechanism 20 are closed as shown in FIG. 2. When the brake hydraulic pressure in the first port 31*b* increases to a predetermined pressure or higher, the second valve portion 21 leaves the second valve seat 71 while the first valve portion 11 is still seated on the first valve seat 22, as shown in FIG. 4. Since the second valve mechanism 20 is opened in this manner, the brake fluid can be smoothly released to the first main hydraulic pressure passage 9*a* from the stroke simulator 2.

When the first valve mechanism 10 and the second valve mechanism 20 are closed due to the stoppage of the motor as shown in FIG. 2, the brake fluid which has flown into the stroke simulator 2 (see FIG. 1) may be sealed in the stroke simulator 2 to increase brake hydraulic pressure in the first port 31*b* to a predetermined pressure or higher. In this case, due to the brake hydraulic pressure, the second valve portion 21 leaves the second valve seat 71 while the first valve portion 11 is still seated on the first valve seat 22, as shown in FIG. 4. Since the second valve mechanism 20 is opened in this manner, the brake fluid can be smoothly released to the first main hydraulic pressure passage 9*a* from the stroke simulator 2. It is therefore possible to prevent shortage of brake fluid when the brake hydraulic pressure in the first main hydraulic pressure passage 9*a* is increased by the master cylinder 1.

Although the embodiment has been described above, the invention is not limited thereto, but it may be changed desirably without departing from the gist thereof.

For example, in the embodiment, the retention member 12 having a cylindrical shape with a bottom and retaining the second valve portion 21 is provided in the movable core 40 as shown in FIG. 2. However, the shape of the retention member 12 is not limited. Further, the retention member 12 could be omitted.

In the embodiment, the valve housing 30 and the valve seat member 70 are formed separately. However, the second valve seat may be formed in the valve housing 30.

The invention claimed is:

1. A brake hydraulic pressure generating device, including:
   a master cylinder which is operated by operation of a brake operator;
   a stroke simulator which provides a pseudo operational force to the brake operator;
   a main hydraulic pressure passage which communicates between the master cylinder and a wheel cylinder;

a branch hydraulic pressure passage which is branched from the main hydraulic pressure passage and reaches the stroke simulator; and an on/off valve which opens/closes the branch hydraulic pressure passage, wherein the on/off valve includes
a first valve mechanism including
a first valve portion and
a first valve seat which has an annular shape and receives the first valve portion, and
a second valve mechanism including
a second valve portion which has a cylindrical shape, the first valve seat being formed in the second valve portion and
a second valve seat which has an annular shape and receives the second valve portion, wherein a pressure receiving area in which brake hydraulic pressure acting from a stroke simulator side is received is set to be higher in the second valve portion than in the first valve portion, wherein, when brake hydraulic pressure on a master cylinder side is higher than brake hydraulic pressure on the stroke simulator side, the first valve portion is separated from the first valve seat so as to allow brake fluid to flow from the main hydraulic pressure passage to the stroke simulator through the first valve mechanism, and wherein, when brake hydraulic pressure on the stroke simulator side is higher than brake hydraulic pressure on the master cylinder side, the second valve portion is separated from the second valve seat due to brake hydraulic pressure acting on the second valve portion from the stroke simulator side, so as to allow brake fluid to flow from the stroke simulator to the main hydraulic pressure passage through the second valve mechanism.

2. The brake hydraulic pressure generating device of claim 1,
wherein the on/off valve is an solenoid valve including a fixed core and a movable core in which the first valve portion is provided,
wherein a retention member which retains the second valve portion is attached to the movable core,
wherein the retention member can move relatively to the second valve portion, and
wherein a distance between the movable core and the fixed core in a state where the first valve mechanism and the second valve mechanism are closed is set so that the first valve portion can leave the first valve seat and the second valve portion can be seated on the second valve seat when the movable core abuts against the fixed core.

3. The brake hydraulic pressure generating device of claim 2,
wherein the retention member is formed into a cylindrical shape;
wherein a part of the second valve portion is inserted into the retention member; and
wherein an engagement portion which forms a stopper for preventing the second valve portion from falling out is formed in the retention member.

4. The brake hydraulic pressure generating device of claim 1,
wherein the second valve portion leaves the second valve seat when brake hydraulic pressure not lower than a predetermined pressure acts on the second valve portion from the stroke simulator side in a state where the first valve mechanism and the second valve mechanism are closed.

* * * * *